US012747611B2

(12) United States Patent
Lai

(10) Patent No.: US 12,747,611 B2
(45) Date of Patent: Sep. 29, 2026

(54) DUAL UNLOCK PADLOCK WITH RESET FUNCTION

(71) Applicant: The Sun Lock Company Limited, Tuen Mun (HK)

(72) Inventor: Karl Lai, Tai Po (HK)

(73) Assignee: The Sun Lock Company Limited, Tuen Mun (HK)

( * ) Notice: Subject to any disclaimer, the term of this patent is extended or adjusted under 35 U.S.C. 154(b) by 43 days.

(21) Appl. No.: 18/984,991

(22) Filed: Dec. 17, 2024

(65) Prior Publication Data

US 2025/0223837 A1 Jul. 10, 2025

Related U.S. Application Data

(60) Provisional application No. 63/617,808, filed on Jan. 5, 2024.

(51) Int. Cl.
*E05B 37/00* (2006.01)
*E05B 37/02* (2006.01)

(52) U.S. Cl.
CPC ...... *E05B 37/0034* (2013.01); *E05B 37/0058* (2013.01); *E05B 37/025* (2013.01)

(58) Field of Classification Search
CPC . E05B 37/0034; E05B 37/0058; E05B 37/025
See application file for complete search history.

(56) References Cited

U.S. PATENT DOCUMENTS 340,427 A 4/1886 De la Hooke
952,291 A 3/1910 Withers
1,993,408 A 3/1935 Ledin
2,227,803 A 1/1941 Bales
2,793,522 A 5/1957 Tornoe
3,824,819 A 7/1974 Neary
4,351,171 A 9/1982 Tsui
4,733,548 A 3/1988 Ling
5,727,405 A 3/1998 Cromwell
6,100,802 A 8/2000 Adams
(Continued)

FOREIGN PATENT DOCUMENTS

CN 108979328 A 12/2018
GB 2451932 A 2/2009
TW 201122198 A 7/2011

*Primary Examiner* — Kristina R Fulton
*Assistant Examiner* — Thomas L Neubauer
(74) *Attorney, Agent, or Firm* — Ware, Fressola, Maguire & Barber LLP

(57) ABSTRACT

The present invention is directed to a padlock having dual locking control mechanisms, where one locking control mechanism is a key controlled mechanism and the other locking control mechanism is a combination controlled mechanism. The key controlled mechanism is configured to allow for unlocking and locking of the padlock through the use of a correct cut key, and the combination controlled mechanism is configured to allow for unlocking and locking of the padlock through the use of a correct lock open code entered into the combination controlled mechanism. The padlock may contain a combination reset function which enhances the user experience by allowing the user to have both hands available to turn the dials when resetting and/or reconfiguring the correct lock open code of the combination controlled mechanism.

18 Claims, 10 Drawing Sheets

(56) References Cited

U.S. PATENT DOCUMENTS

| | | | |
|---|---|---|---|
| 6,176,109 | B1 | 1/2001 | Tsui |
| 6,516,643 | B1 | 2/2003 | Olshausen |
| 6,792,778 | B1 | 9/2004 | Chen |
| 6,860,125 | B1 | 3/2005 | Yu |
| 6,904,776 | B1 | 6/2005 | Lin |
| 7,007,521 | B1 | 3/2006 | Misner et al. |
| 7,100,401 | B2 | 9/2006 | Yu |
| 7,140,209 | B2 | 11/2006 | Lai |
| 7,628,045 | B2 | 12/2009 | Yu |
| 8,011,212 | B2 | 9/2011 | Yu |
| 2002/0088256 | A1 | 7/2002 | Taylor et al. |
| 2004/0226324 | A1 | 11/2004 | Loughlin et al. |
| 2004/0255624 | A1 | 12/2004 | Loughlin et al. |
| 2005/0034492 | A1 | 2/2005 | Yu |
| 2005/0039501 | A1 | 2/2005 | Yu |
| 2005/0044900 | A1 | 3/2005 | Yu |
| 2005/0044901 | A1 | 3/2005 | Yu |
| 2005/0044902 | A1 | 3/2005 | Yu |
| 2005/0092037 | A1 | 5/2005 | Meekma et al. |
| 2005/0262903 | A1 | 12/2005 | Ling et al. |
| 2006/0260369 | A1 | 11/2006 | Lai et al. |
| 2006/0266084 | A1 | 11/2006 | Kuo et al. |
| 2007/0227202 | A1 | 10/2007 | Yen et al. |
| 2013/0111958 | A1 | 5/2013 | Kuo et al. |
| 2016/0222698 | A1 * | 8/2016 | Lai ...................... E05B 37/0017 |
| 2020/0318389 | A1 | 10/2020 | Luo |

* cited by examiner

DUAL UNLOCK PADLOCK WITH RESET FUNCTION

CROSS-REFERENCE TO RELATED APPLICATIONS

This application claims priority to U.S. Provisional Appl. No. 63/617,808 filed Jan. 5, 2024, which is hereby incorporated by reference in its entirety.

BACKGROUND OF THE INVENTION

1. Field of the Invention

The present invention generally relates to padlocks, and more particularly to a padlock having more than one unlocking function and a reset function.

2. Related Art

The combination padlock discussed in U.S. Pat. No. 7,140,209 entitled Padlock with Fully Integrated Dual Locking System, which is hereby incorporated by reference in its entirety, is one of the most commonly used travel padlocks. The previous padlocks may only allow user to push the reset button and allow only one hand to rotate dials which make the entire reset process to be very difficult.

SUMMARY OF THE INVENTION

An exemplary embodiment of the present invention is directed to a padlock having dual locking control mechanisms, where one locking control mechanism is a key controlled mechanism and the other locking control mechanism is a combination controlled mechanism. The key controlled mechanism is configured to allow for unlocking and locking of the padlock through the use of a correct cut key, and the combination controlled mechanism is configured to allow for unlocking and locking of the padlock through the use of a preset combination entered into the combination controlled mechanism. Also, the padlock contains a new combination reset function which enhances the user experience by allowing the user to have both hands to turn the dials when resetting and/or reconfiguring the combination of the combination controlled mechanism.

An exemplary embodiment of the present invention is directed to padlock including a lock body, a bolt-cam mounted in the lock body and configured for rotational movement between a lock state and unlock state, a combination controlled mechanism configured to control the rotational movement of the bolt-cam at least from the lock state to the unlock state, a key controlled mechanism configured to control the rotational movement of the bolt-cam between the lock state and the unlock state, and a cable having a flexible-end neck configured for retention and removal from the lock body and a fixed end terminal neck mounted in the lock body, and the flexible-end neck is operatively engaged with the bolt-cam for configuring the padlock between a locked mode when the flexible-end neck is retained in the locked body and an unlocked mode when the flexible-end neck is removed from the lock body.

According to this and other exemplary aspects of the present invention, the combination controlled mechanism may include a spindle mounted for rectilinear movement within the lock body, one or more clutches and a reset clutch mounted in the lock body and configured to control rectilinear movement of the spindle within the lock body, and the one or more clutches and the reset clutch are configured for rotational movement about the spindle.

According to this and other exemplary aspects of the present invention, the combination controlled mechanism may also include a plurality of dials mounted in the lock body, the plurality of dials may include dial for each clutch of the one or more clutches and the reset clutch, and each dial of the plurality of dials are configured to control the rotational movement of the corresponding clutch or reset clutch.

According to this and other exemplary aspects of the present invention, the bolt-cam may include a pair of surfaces positioned on opposite sides of the bolt-cam, and the bolt-cam further may include a center-pole extending from at least one surface of the pair of surface and configured to restrict movement of the bolt-cam within the lock body to only the rotational movement of the bolt-cam between the lock state and the unlock state.

According to this and other exemplary aspects of the present invention, the bolt-cam may include a locking surface configured to engage with the flexible-end neck of the cable during the locked mode.

According to this and other exemplary aspects of the present invention, the bolt-cam may include an opening notch configured to align with the flexible-end neck of the cable when the bolt-cam is in the unlock state to allow the flexible end cable to be removed from the lock body in the unlocked mode of the padlock.

According to this and other exemplary aspects of the present invention, the bolt-cam may include a spring receiving arm configured to receive a bolt-cam spring, the bolt-cam spring is configured to urge the bolt-cam to the lock state such that the locking surface is urged into engagement with the flexile-end neck of the cable, the bolt-cam spring is further configured to receive a spring-receiving pin of a snap plate, and the bolt-cam spring is further configured to urge a tail of the snap plate toward an indicator such that when the key controlled mechanism controls the bolt-cam from the lock state to the unlock state the tail of the snap plate will engage into a neck surface of the indicator.

According to this and other exemplary aspects of the present invention, the bolt-cam may include a control surface configured to allow the key controlled mechanism and combination controlled mechanism to control the rotational of the bolt-cam from lock state to the unlock state.

According to this and other exemplary aspects of the present invention, the bolt-cam control surface is configured to allow the key controlled mechanism to operate the padlock from the locked mode to the unlocked mode without interference with the combination controlled mechanism.

According to this and other exemplary aspects of the present invention, the bolt-cam control surface is configured to allow the combination controlled mechanism to operate the padlock from the locked mode to the unlocked mode without interference with the key controlled mechanism.

According to this and other exemplary aspects of the present invention, the combination controlled mechanism further may include a button, and a reset plate to control the rotational movement of the bolt-cam from the lock state to the unlock state.

According to this and other exemplary aspects of the present invention, the key controlled mechanism may include a cylinder mounted in the lock body, a cam operatively connected to the cylinder, and a key controlled latch to control the rotational movement of the bolt-cam from the lock state to the unlock state.

According to this and other exemplary aspects of the present invention, the indicator is configured to be activated by the key controlled mechanism and reset by the combination controlled mechanism, the indicator may include a middle-surface configured for engagement with the tail of the snap plate, and when the key controlled mechanism is operated an indicator-slope of the key controlled latch will engage with a slope of the indicator to cause at least a portion of the indicator to protrude from the lock body, the bolt-cam spring will urge the tail of the snap plate to engage with the neck surface of the indicator to lock the indicator in position protruding from the lock body, and the indicator is configured to be reset by the combination controlled mechanism allows movement of the bolt-cam to the unlocked state.

According to this and other exemplary aspects of the present invention, the reset plate is configured to at least partially extend out from the lock body as an indication the padlock is in the reset mode; and a correct lock open code must be set on all the dials to operate the padlock to the reset mode.

According to this and other exemplary aspects of the present invention, the spindle comprising at least one extended-fin configured to align with the opening gap of the clutches and reset clutch to allow the reset plate to slide the clutches and reset clutch upward to operate the padlock into the reset mode.

According to this and other exemplary aspects of the present invention, the reset plate contains a slope member to slide a slope of the reset clutch upward during the reset mode.

According to this and other exemplary aspects of the present invention, the reset plate contains an edge to align an edge of the reset clutch such that the reset clutch will hold the reset plate in position during the reset process and allow the user to have both hands free for setting the new lock open code.

According to this and other exemplary aspects of the present invention, the spindle may include an extended-fin for each of the one or more clutches and the reset clutch, and each of the one or more clutches and the reset clutch comprise an opening gap formed therein to allow the corresponding extended-fin to pass therethrough.

According to this and other exemplary aspects of the present invention, when a correct lock open code has been set on all the dials the opening-gaps of the one or more clutches and reset clutch align with the corresponding extended-fins of the spindle, the button is configured to be pushed inward into the lock body when the correct lock open code has been set, and a slope of the button will push a slope of the spindle in a direction substantially perpendicular to the movement of the button such that the extended-fins of the spindle travel into the corresponding opening gaps of the one or more clutches and reset clutch, the movement of the spindle allow the button to travel further inward and a control wall of the button to contact the bolt-cam which will allow the bolt-cam to rotate to the unlock state, such that an opening notch of the bolt-cam aligns with the flexible-end neck of the cable which alignment allows a spring rod to push the flexible end cable out of the lock body to operate the padlock to the unlocked mode.

According to this and other exemplary aspects of the present invention, the button further may include an indicator-contact-surface configured to push a tail of a snap plate away from a neck surface of an indicator which an indicator spring to push the indicator into the lock body.

According to this and other exemplary aspects of the present invention, the key controlled mechanism may include a cylinder mounted in the lock body, a cam operatively connected to the cylinder, and a key controlled latch to control the rotational movement of the bolt-cam from the lock state to the unlock state, when a correct cut key is inserted into the cylinder, the cylinder is configured to rotate and transfer such rotational movement to the cam as a result of operative engagement of a joint slot of the cylinder and a joint square of the cam, the cam may include an extended round tip which is configured for engagement with a catcher of the key controlled latch and the rotational movement causes rectilinear movement of the key controlled latch, the key controlled latch may include a bolt-contact-surface configured for operative engagement with a control wall of the bolt-cam to transfer the rectilinear movement of the key controlled latch to rotational movement of the bolt-cam such that the bolt-cam is placed in the unlocked state, the bolt-cam may include an opening notch configured to align with the flexible-end neck of the cable when the bolt-cam is in the unlock state to allow the flexible end cable to be removed from the lock body in the unlocked mode of the padlock.

According to this and other exemplary aspects of the present invention, as the key controlled latch may include an indicator-slope configured to slide a slope of an indicator upward and cause a tail of a snap plate to engage into a neck surface of the indicator, the indicator is extended out of the lock body indicating that the padlock has been operated to the unlocked mode by the key controlled mechanism.

According to this and other exemplary aspects of the present invention, a padlock according to the exemplary aspect of the present invention may include a lock body, a bolt-cam positionable between a lock state and unlock state, a combination controlled mechanism configured to control the rotational movement of the bolt-cam, wherein one rotational direction of the bolt-cam is the locked state and the other rotational direction of the bolt-cam is the unlocked state, a key controlled mechanism configured to control the rotational movement of the bolt-cam, a spindle configured to control the locking and unlocking of the combination controlled mechanism, one or more clutches mounted in the lock body and configured to control the vertical movement of the spindle within the lock body, a reset clutch mounted in the lock body and configured to control the vertical movement of the spindle within the lock body, one or more dials mounted in the lock body and configured to control the rotational movement of the clutches to control the vertical movement of the spindle within the lock body, and a cable having a flexible-end neck and a fixed end terminal neck, and the flexible-end neck is controlled by the bolt-cam for configuring the padlock between a locked mode and an unlocked mode.

According to this and other exemplary aspects of the present invention, the bolt-cam contains a center-pole to allow the bolt-cam to only have rotational movement.

According to this and other exemplary aspects of the present invention, the bolt-cam contains a locking surface which is to align to the flexible-end neck of the cable during the locked mode.

According to this and other exemplary aspects of the present invention, the bolt-cam contains an opening notch which is to align to the flexible-end neck of the cable to allow the flexible end cable to be pushed out of the locking holes of the lock body to the unlocked mode.

According to this and other exemplary aspects of the present invention, the bolt-cam contains a spring receiving arm to receive a bolt-cam spring, and the bolt-cam spring is also configured to receive a spring-receiving pin of a snap plate, wherein the bolt-cam spring will always push the bolt-cam to the lock state such that the locking surface will always tend to be pushed to the lock state, wherein the bolt-cam spring will have secondary force to push a tail of the snap plate toward an indicator such that when the key controlled mechanism is activated the tail of the snap plate will engage into a neck surface of the indicator, and the bolt-cam spring pushes the bolt-cam toward the lock state and the snap plate toward the indicator.

According to this and other exemplary aspects of the present invention, the bolt-cam further includes a control surface which is configured to allow the key controlled mechanism and combination controlled mechanism control the rotational of the bolt-cam from lock state to the unlock state.

According to this and other exemplary aspects of the present invention, the bolt-cam control surface will allow the key controlled mechanism to open the padlock from the locked to the unlocked mode without interference with the combination controlled mechanism.

According to this and other exemplary aspects of the present invention, the bolt-cam control surface will allow the combination controlled mechanism to open the padlock from the locked mode to the unlocked mode without interference with the key controlled mechanism.

According to this and other exemplary aspects of the present invention, the combination controlled mechanism comprises a button, the spindle, the one or more clutches, the one or more dials, the reset clutch, and a reset plate to control the rotational movement of the bolt-cam from lock state to unlock state.

According to this and other exemplary aspects of the present invention, the key controlled mechanism comprises the cylinder, a cam, and a key controlled latch to control the rotational movement of the bolt-cam from lock state to unlock state.

According to this and other exemplary aspects of the present invention, the indicator is configured to be activated by the key controlled mechanism and reset by the combination controlled mechanism, wherein the indicator contains a middle-surface which is a lock state/preset state so that prior activation by the key controlled mechanism the tail of the snap plate will lay on the middle-surface, and the alignment will change when the key controlled mechanism is activated such that the indicator-slope of the key controlled latch will slide the slope of the indicator upward, wherein the bolt-cam spring will push the tail of the snap plate to the neck surface of the indicator to lock the indicator in the upright position, and as the indicator is being pushed upward, it will indicate the lock is being open via key controlled mechanism, wherein the indicator will set back downward position via the combination controlled mechanism open state by pushing the button inward such that the indicator-contact-surface of the button will push the tail of the snap plate away from the neck surface of the indicator, and the indicator spring will push the indicator downward back to the preset state (lock state) position.

According to this and other exemplary aspects of the present invention, the reset plate will have some portion extend out of the lock body as a showing of the padlock is in the reset mode.

According to this and other exemplary aspects of the present invention, a portion of the reset plate can only be pulled out of the lock body when the dials, clutches, reset clutch, spindle are all aligned into the correct lock open code.

According to this and other exemplary aspects of the present invention, the extended-fins of the spindle align to the opening gap of the clutches and reset clutch which allow the reset plate to slide the reset clutch upward and also further pushes the clutches above upward for reset dial code.

According to this and other exemplary aspects of the present invention, the reset plate contains a slope member to slide the slope of the reset clutch upward during the reset mode.

According to this and other exemplary aspects of the present invention, the reset plate contains an edge to align the edge of the reset clutch such that the reset clutch will rest and hold on the reset plate during the reset process and allow the user to have both hands free for setting the new combination code.

According to this and other exemplary aspects of the present invention, in combination controlled mechanism lock open mode, the dials, clutches and reset clutch, rotate in the same manner allowing opening-gap of the clutches and reset clutches to align to the extended-fin of the spindle, wherein the button pushes inward to the lock body, the slope of the button will push the slope of the spindle downward such that the extended-fin of the spindle travel into the opening gap of the clutches and reset clutches, wherein this allows the button to travel inward and the control wall of the button will contact the bolt-cam which will allow the bolt-cam to rotate to the open state, such as clockwise, such that the opening notch of the bolt-cam aligns to the flexible-end neck of cable which then allow the spring rod to push the flexible end cable out of the lock body for lock opening via combination.

According to this and other exemplary aspects of the present invention, the button also contains an indicator-contact-surface which will push the tail of the snap plate away from the neck surface of the indicator which will yield the indicator spring to push the indicator downward to make the indicator travel from upward position back to downward (rest position).

According to this and other exemplary aspects of the present invention, in the lock open via key controlled mechanism, a cylinder, cam, key controlled latch and key as the key component to control the rotation of the bolt-cam from lock state to open state, wherein as a correct key cut key is inserted into the cylinder, the cylinder will rotate and the cam in the same manner due to a joint slot and joint square is connected and the rotational movement from the cylinder joint slot will direct transfer to the joint square of the cam, wherein the cam contains an extended round tip which is to assemble into the catcher of the key controlled latch and the rotational movement of the cam will then transfer to a horizontal (left-right) movement for the key controlled latch, wherein as the cylinder/cam rotate clockwise to lock open, the key controlled latch will drag and move leftward toward lock open direction, and as the key controlled latch moves leftward then the bolt-contact-surface will contact the control wall of the bolt-cam to make the bolt-cam to have rotational movement (such as clockwise) such that the alignment of the flexible-end neck of the cable from aligning locking surface of the bolt cam to opening notch of the bolt cam, wherein the spring rod spring will push the spring rod upward, and as the spring rod pushes upward, it will align the opening notch of the bolt-cam and the flexible end will pop out of the cable end channel-flexible end of the lock body and the padlock is opened.

According to this and other exemplary aspects of the present invention, as the key controlled latch is operated by the key controlled mechanism, the indicator-slope of the key controlled latch will slide the slope of indicator upward and the tail of the snap plate will engage into the neck surface of the indicator, wherein the indicator is extended out of the lock body showing to the user that the lock has been activated by the key controlled mechanism.

According to this and other exemplary aspects of the present invention, a reset plate will extend some portion to the lock body to demonstrate to the user that the lock is in reset mode.

The reference numbers and corresponding elements are summarized below:

10 Padlock
20 Body Front Side
21 Cable end channel-Flexible End
22 Cable End Channel-Fixed End
23 Cylinder hole
24 Cam hole
25 Sub-body slot
26 Button Slot
27 Reset wing slot
28 Spindle Tail slot
29 Clutch holes
20a. Dial holes
20b clutch protrusion slot
30 Body Rear Side
31 Cable end channel-Flexible End
32 Cable End Channel-Fixed End
33 Cylinder hole
34 Cam hole
35 Bolt-cam-pole slot
36 Indicator slot
37 Button slot
38 Reset wing slot
39 Spindle Tail Slot
30a clutch holes
30b Dial holes
30c clutch protrusion slot
30d fixed neck slot
40 Cylinder
41 Joint slot
50 Cam
51 Joint Square
52 hole
53 Protrusion slot
54 Extended Round tip
60 Spring Rod
61 Protrusion
62 Bottom
70 Key Controlled latch
71 Catcher
72 Bolt-contact-surface
73 Indicator-slope
80 Bolt-cam
81 Locking Surface
82 Center-pole
83 Control surface
84 Spring receiving arm
85 Opening Notch
90 Button
91 Push-area
92 Slope
93 Indicator-contact-surface
94 Control Wall
100 Indicator
101 Large diameter
102 Neck Surface
103 Slope
104 Middle-surface
110 Snap Plate
111 Spring-receiving-pin
112 Tail
120 Spindle
121 Slope
122 Extended-fin
123 Spring-load-area
124 Tail
130 Clutch
131 Extended-fin
132 Opening-gap
133 Spindle hole -continued 140 Dial
141 Teeth
150 Reset Clutch
151 Extended-fin
152 Opening-gap
153 Spindle hole
154. Slope
155 Edge
160 Reset Plate
161 Wing
162 Gap
163 Slope
164 Edge
170 Cable
171 Flexible End
172 Flexible-end neck
173 Fixed End
174 Fixed End terminal Neck
180 Sub-Body
181 Bolt-Cam cutout zone
182 Bolt Cam Spring Cutout
183 Snap plate tail receiving zone
190 Ratchet Plate
200 Spindle Spring
210 Indicator Spring
220 Bolt-Cam Spring
230 Spring rod spring
240 Key

BRIEF DESCRIPTION OF THE DRAWINGS

For a fuller understanding of the nature and object of the present invention, reference should be had to the following detailed description taken in connection with the accompanying drawings, in which.

DETAILED DESCRIPTION

Figure 1A:
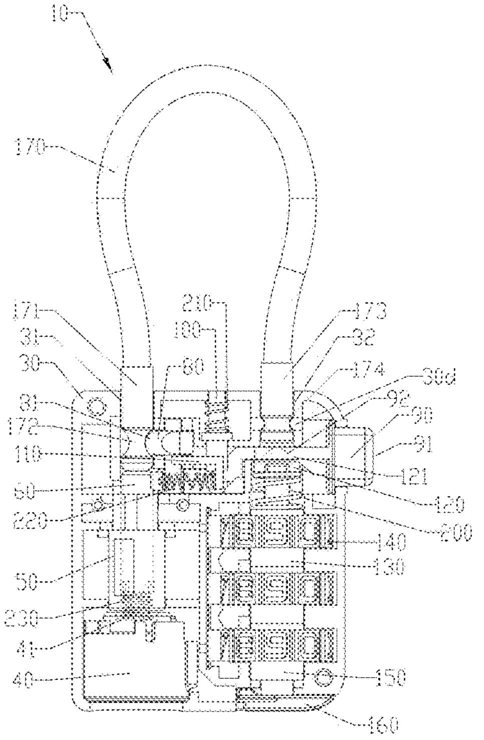
FIG. 1A is a front view of an exemplary padlock according to an aspect of the invention in a locked mode with an exemplary body front side and an exemplary sub-body removed.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Figure 1B:
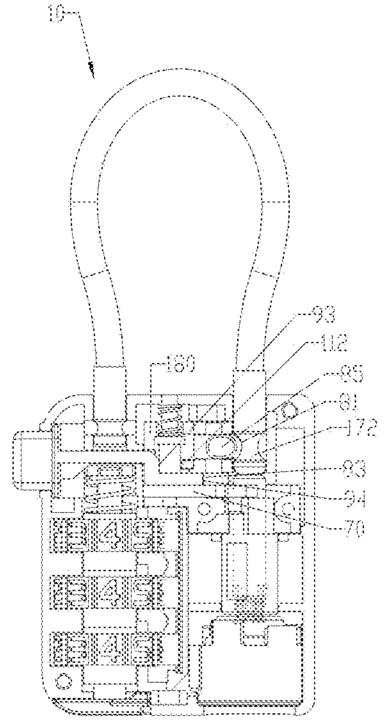
FIG. 1B is a rear view of the exemplary padlock with an exemplary body rear side removed.
Figure 1C:
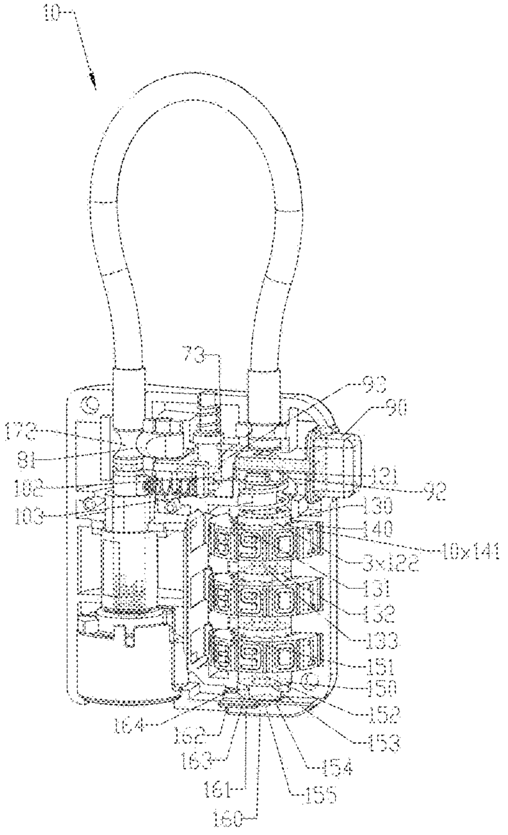
FIG. 1C is a perspective front view of the exemplary padlock with the exemplary body front side and the exemplary sub-body removed.
Figure 1D:
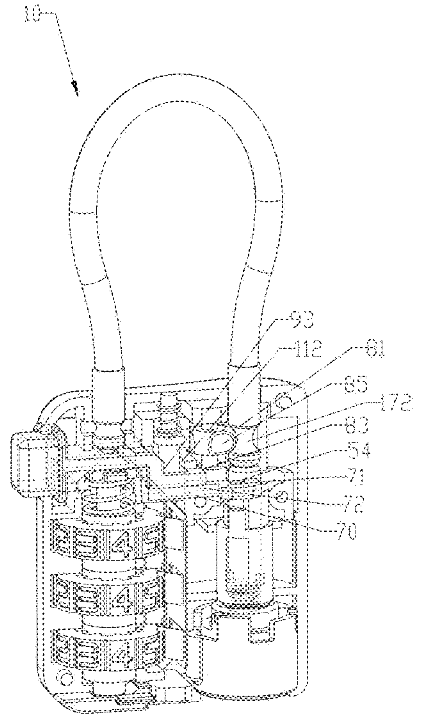
FIG. 1D is a perspective rear view of the exemplary padlock with the exemplary body rear side removed.
Figure 1E:
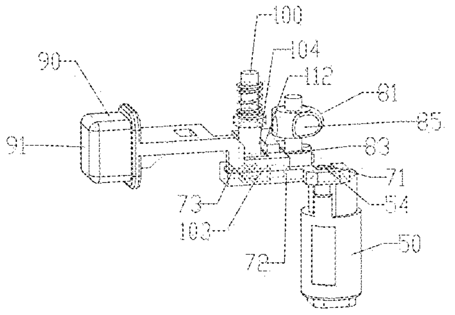
FIG. 1E is a perspective view of an exemplary locking mechanism that may be used with the exemplary padlock according to an aspect of the present invention.
Figure 1F:
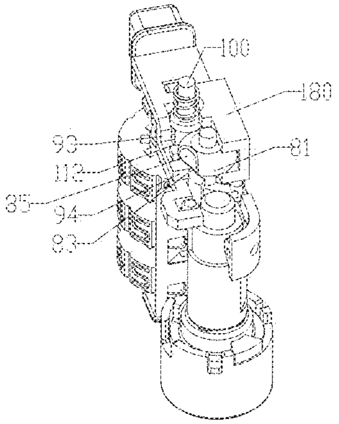
FIG. 1F is a perspective view of the exemplary locking mechanism operatively coupled to an exemplary cylinder and combination controlled mechanism that may be used with the exemplary padlock according to an aspect of the present invention.
Figure 1G:
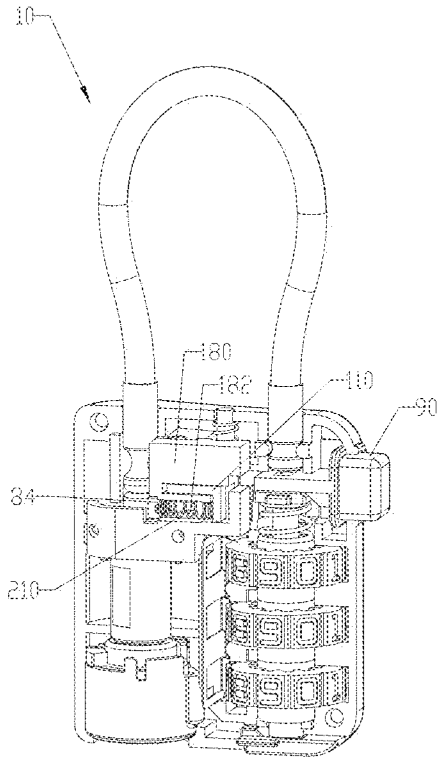
FIG. 1G is a perspective front view of the exemplary padlock with the exemplary body front side sub-body removed.
Figure 2:
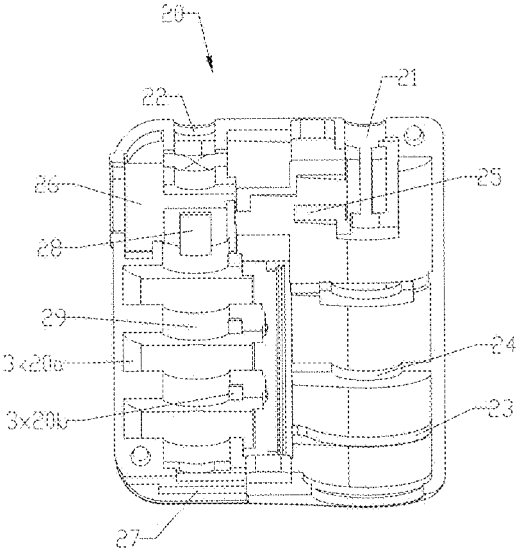
FIG. 2 is a perspective view of the exemplary body front side that may be used with the exemplary padlock according to an aspect of the present invention.
Figure 3:
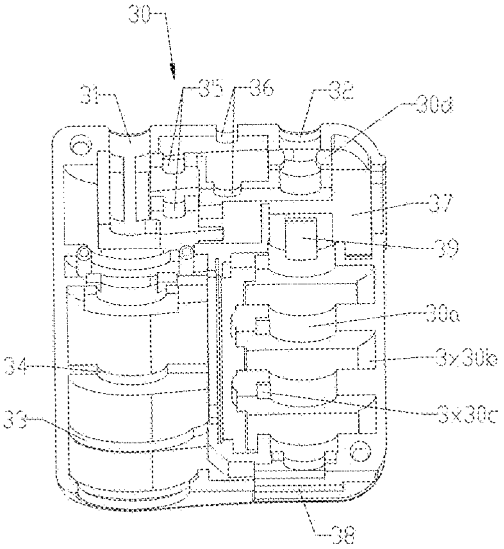
FIG. 3 is a perspective view of the exemplary body rear side that may be used with the exemplary padlock according to an aspect of the present invention.
Figure 4:
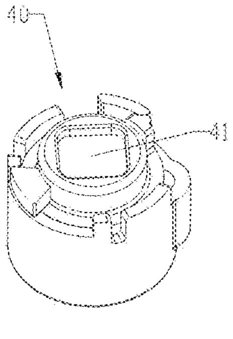
FIG. 4 is a perspective view of the exemplary cylinder that may be used with the exemplary padlock according to an aspect of the present invention.
Figure 5A:
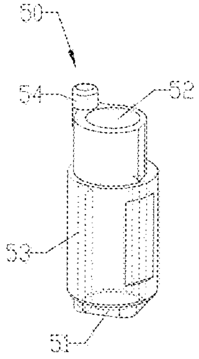
FIG. 5A is a top perspective view of an exemplary cam that may be used with the exemplary padlock according to an aspect of the present invention.
Figure 5B:
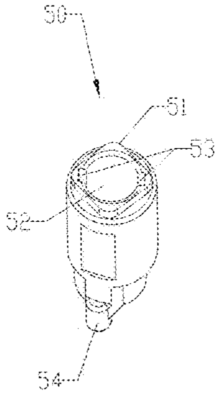
FIG. 5B is a bottom perspective view of the exemplary cam that may be used with the exemplary padlock according to an aspect of the present invention.
Figure 6:
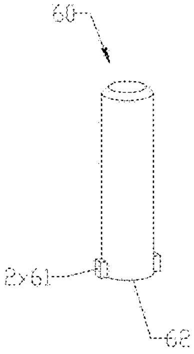
FIG. 6 is a perspective view of an exemplary spring rod that may be used with the exemplary padlock according to an aspect of the present invention.
Figure 7:
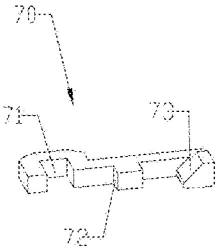
FIG. 7 is a perspective view of an exemplary key controlled latch that may be used with the exemplary padlock according to an aspect of the present invention.
Figure 8A:
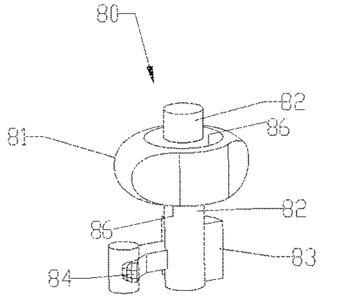
FIG. 8A is a front perspective view of an exemplary bolt-cam that may be used with the exemplary padlock according to an aspect of the present invention.
Figure 8B:
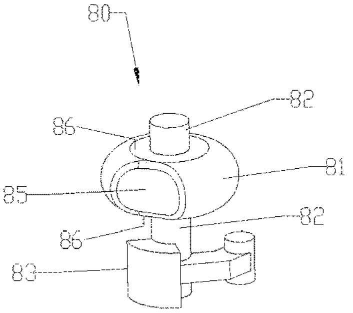
FIG. 8B is a rear perspective view of the exemplary bolt-cam that may be used with the exemplary padlock according to an aspect of the present invention.
Figure 9A:
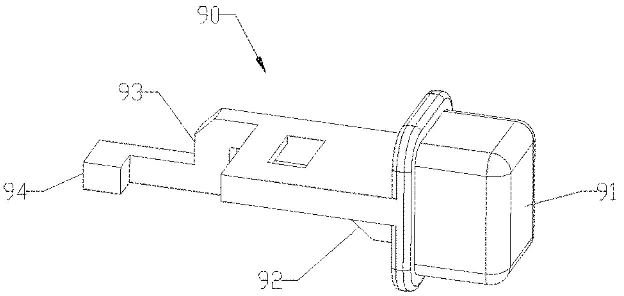
FIG. 9A is a top perspective view of an exemplary button that may be used with the exemplary padlock according to an aspect of the present invention.
Figure 10:
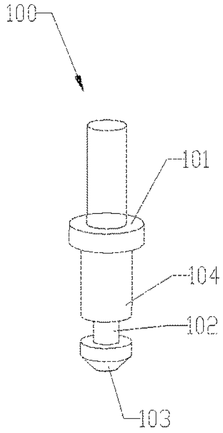
FIG. 10 is a perspective view of an exemplary indicator that may be used with the exemplary padlock according to an aspect of the present invention.
Figure 9B:
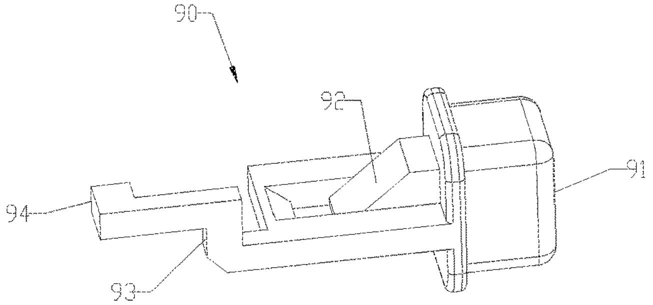
FIG. 9B is a bottom perspective view of the exemplary button that may be used with the exemplary padlock according to an aspect of the present invention.
Figure 12:
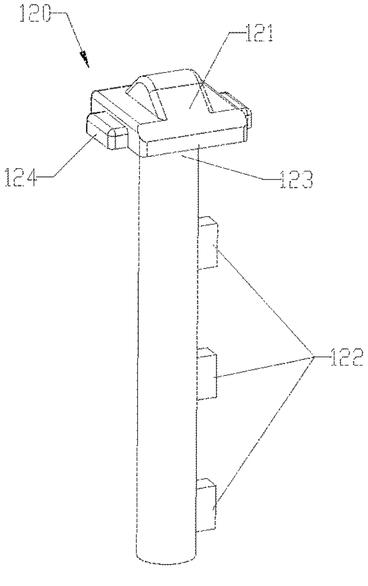
FIG. 12 is a perspective view of an exemplary spindle that may be used with the exemplary padlock according to an aspect of the present invention.
Figure 11:
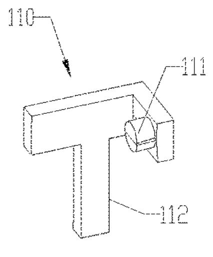
FIG. 11 is a perspective view of an exemplary snap plate that may be used with the exemplary padlock according to an aspect of the present invention.
Figure 13:
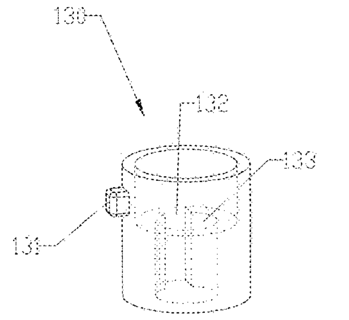
FIG. 13 is a perspective view of an exemplary clutch that may be used with the exemplary padlock according to an aspect of the present invention.
Figure 14:
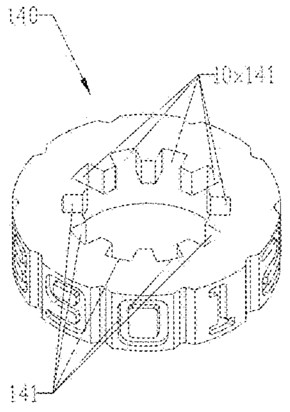
FIG. 14 is a perspective view of an exemplary dial that may be used with the exemplary padlock according to an aspect of the present invention.
Figure 15:
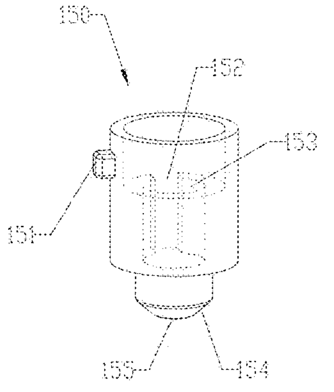
FIG. 15 is a perspective view of an exemplary reset clutch that may be used with the exemplary padlock according to an aspect of the present invention.
Figure 16:
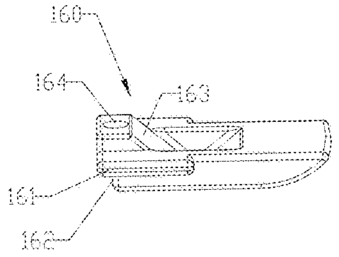
FIG. 16 is a perspective view of an exemplary reset plate that may be used with the exemplary padlock according to an aspect of the present invention.
Figure 17:
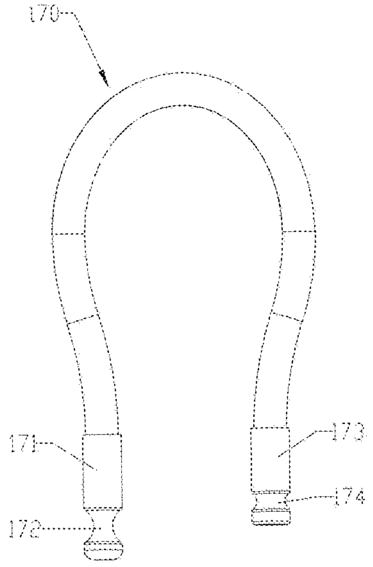
FIG. 17 is a perspective view of an exemplary cable that may be used with the exemplary padlock according to an aspect of the present invention.
Figure 18:
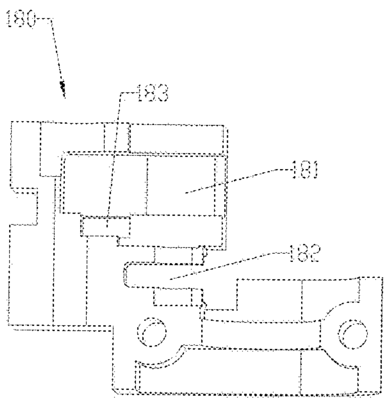
FIG. 18 is a perspective view of the exemplary sub-body that may be used with the exemplary padlock according to an aspect of the present invention.

Referring now to FIGS. 1A-18, therein illustrated is an exemplary padlock, generally indicated by reference numeral 10 in FIGS. 1A-1D and 1G. The padlock 10 may be constructed from a body front side 20 and a body rear side 30 that may be combined together in order to form a lock body for the components of the padlock 10. The padlock 10 may also include a cable 170 configured for retention within the lock body formed by the body front side 20 and the body rear side 30. The body front side 20 of the padlock 10 may include a cable end channel-flexible end 21 positioned so as to be opposite a cable end channel-flexible end 31 of the body rear side 30 and form an opening configured to receive and releasably retain a flexible end 171 of the cable 170. The body front side 20 may also include a cable end channel-fixed end 22 positioned so as to be opposite a cable end channel-fixed end 32 of the body rear side 30 and form an opening configured to receive and retain a fixed end 173 of the cable 170. Each of the body front side 20 and the body rear side 30 include a cylinder hole 23/33 configured and dimensioned to receive and retain a cylinder 40 within the padlock 10. The body front side 20 and the body rear side 30 may each further include a cam hole 24/34 configured and dimensioned to receive and retain a cam 50 within the padlock 10. The body front side 20 and the body rear side 30 may also each include one or more clutch holes 29/30*a*, one or more dial holes 20*a*/30*b* and one or more clutch protrusion slots 20*b*/30*c*. The one or more clutch holes 29/30*a* are configured and dimensioned to each receive one of the one or more clutches 130 or a reset clutch 150 within the padlock 10, and the one or more dial holes 20*a*/30*b* are configured and dimensioned to each receive one of the one or more dials 140 within the padlock 10. The one or more clutches 130 and the reset clutch 150 each include at least one extended-fin 131/151 configured to be received within one of the clutch protrusion slots 20*b*/30*c*. Each of the one or more clutches 130 and the reset clutch 150 may also include an opening-gap 132/152 and a spindle hole 133/153, and the reset clutch 150 may further include a slope 154 and an edge 155 extending from the slope 154.

Still referring to FIGS. 1A-18, each of the body front side 20 and the body rear side 30 of the padlock 10 may also each include a button slot 26/37 configured to allow a button 90 of the padlock 10 to at least partially extend out of the lock body of the padlock 10. The button 90 may include a push-area 91 extending out of the lock body of the padlock 10, a slope 92 positioned adjacent to the push-area 91, an indicator-contact-surface 93 and a control wall 94. The body front side 20 and the body rear side 30 may also each include a reset wing slot 27/38 configured to receive, retain and allow for slidable movement of a wing 161 of a reset plate 160 of the padlock 10. The reset plate 160 may also include a gap 162 formed at one end thereof, a slope 163 formed on a surface thereof, and an edge 164 positioned adjacent to the slope 163. Each of the body front side 20 and the body rear side 30 of the padlock 10 may further include a spindle tail slot 28/39 dimensioned and configured to receive a tail 124 of a spindle 120 disposed within the padlock 10. The spindle 120 may also include a slope 121 positioned at one end thereof, a surface to form a spring-load area 123 and one or more extended-fins 122 extending from the spindle 120. The spindle 120 is dimensioned so as to pass through the spindle holes 133/153 of the one or more clutches 130 and reset clutch 150. The body front side 20 of the padlock 10 may also include a sub-body slot 25 configured to receive a sub-body 180 of the padlock 10. The body rear side 30 may further include a bolt-cam pole slot 35 configured to receive a center-pole 82 of a cam 80 within the padlock 10, and allow for rotational movement of the cam 80 about the center-pole 82. The body rear side 30 may also include an indicator slot 36 configured to allow an indicator 100 to protrude from the padlock 10 when the padlock 10 has been operated by the key controlled mechanism to an unlocked mode in which the flexible end 171 of the cable 170 is separated from the lock body. The indicator 100 may include a large diameter 101 that is larger than the diameter of the indicator slot 36 in order to provide for retention of at least a portion of the indicator 100 within the padlock 10. The indicator 100 may also include a neck surface 102 positioned between a middle-surface 104 and a slope 103. The body rear side 30 may also include a fixed neck slot 30*d* configured to receive and retain a fixed end terminal neck 174 of the fixed end 173 of the cable 170 within the padlock 10.

Still referring to FIGS. 1A-18, the cylinder 40 of the padlock 10 may include a joint slot 41 configured to receive a joint square 51 of the cam 50 so that when a correct cut key 240 is inserted into the cylinder 40 and rotated, rotational movement of the cylinder 40 is transferred to the cam 50. The cam 50 may also include a hole 52 formed therein and configured for receipt of a spring rod 60. The spring rod 60 includes one or more protrusions 61 extending therefrom and configured for receipt within corresponding protrusion slots 53 of the cam 50, so that rotation of the cam 50 is imparted to the spring rod 60. Positioned between a bottom 62 of the spring rod 60 and the joint slot 41 of the cylinder 40 is a spring rod spring 230 that urges the spring rod 60 in a direction away from the cylinder 40. The cam 50 may also include an extended round tip 54 positioned at an opposite end of the cam 50 from the joint square 51. The extended round tip 54 is configured to engage with a catcher 71 of a key controlled latch 70. The key controlled latch 70 is configured for actuation by the key controlled mechanism comprised of the cylinder 40 and the cam 50, and the key controlled latch 70 includes a bolt-contact surface 72 for operatively engaging with the bolt-cam 80, and an indicator-slope 73 for operatively engaging with the slope 103 of the indicator 100. The bolt-contact surface 72 of the key controlled latch 70 is configured to engage with a control surface 83 of the bolt-cam 80 in order to rotate the bolt-cam 80 from the lock state to the unlock state. In the unlock state, a locking surface 81 of the bolt-cam 80 is no longer engaged with a flexible-end neck 172 of the flexible end 171 of the cable 170, and an opening notch 85 of the bolt-cam 80 is aligned with the flexible-end neck 172 so as to allow for release of the flexible end 171 of the cable 170 of the padlock 10 in order to configure the padlock 10 to the unlocked mode. The bolt-cam 80 may also include a spring receiving arm 84 configured for engagement with a bolt-cam spring 220. The other end of the bolt-cam spring 220 is configured for engagement with a spring-receiving-pin 111 of a snap plate 110. A tail 112 of the snap plate 110 is configured to be urged into the middle surface 104 of the indicator 100.

Each of the one or more dials 140 may have teeth 141 positioned along an interior perimeter of the dials 141, which teeth 141 are configured for engagement with the one or more extended-fins 131/151 of the one or more clutches 130 and/or reset clutch 150 so that rotation of the dials 140 around the spindle 120 results in corresponding rotation of the clutches 130 and reset clutch 150 about the spindle 120. The extended-fins 131/151 are assembled in the teeth 141 of the dials 140 so that turning of dials 140 will turn the clutches 130 and the reset clutch 150 and the extended-fins 131/151 in the same manner. Each of the dials 140 has one or more indicia, which may be in the form of numbers, symbols, letters, colors or the like, corresponding to each tooth of the teeth 141. For example, in the exemplary embodiment ten indicia in the form of the numbers 0-9 are illustrated, and each of the dials 140 have ten teeth 141. A ratchet plate 190 may be positioned in the padlock 10 in order to give an indication when a distinct indicia of each of the dials 140 of the combination controlled mechanism has been selected. The sub-body 180 may include a bolt-cam cutout zone 181, a bolt-cam spring cutout 182 and a snap plate tail receiving zone 183. A spindle spring 200 may be positioned between the upper most clutch 130 of the one or more clutches 130 and the spring-load area 123 of the spindle 120 so as to urge the spindle 120 in a direction towards the slope 92 of the button 90. An indicator spring 210 may be positioned between the body rear side 30 and the large diameter 101 of the indicator 100 to urge the indicator 100 in a direction towards the interior of the padlock 10.

Still referring to FIGS. 1A-18, the function of the bolt-cam 80 of the padlock 10 will now be discussed. The locking surface 81 of the bolt-cam 80 engages into the flexible-end neck 172 of the flexible end 171 of the cable 170 in the locked mode of the padlock 10. The center-pole 82 of the bolt-cam 80 allows the bolt-cam 80 to rotate and align the opening notch 85 of the bolt-cam 80 to the flexible-end neck 172 of the flexible end 171 of the cable 170 to open the padlock 10. The center-pole 82 of the bolt-cam 80 may extend from at least one surface 86 of a pair of surfaces 86 positioned on opposite sides of the bolt-cam 80. The bolt-cam 80 may be controlled by the combination controlled mechanism through the control wall 94 of the button 90 which is configured to urge the control surface 83 of the bolt-cam 80 from the lock state to the unlock state. The bolt-cam 80 may also be controlled by the key controlled mechanism comprising the cam 50 having the extended round tip 54 assembled into the catcher 71 of the key controlled latch 70. The bolt contact-surface 72 of the key controlled latch 70 pushes the control surface 83 of the bolt-cam 80 from the lock state to the unlock state. The operation of both mechanisms does not interfere with one another.

Referring again to FIGS. 1A-18, the locked mode of the padlock 10 according to an exemplary aspect of the present invention will be discussed. The bolt-cam 80 of the padlock 10 is configured for operation by the combination controlled mechanism and key controlled mechanism. Both mechanisms can activate the bolt-cam 80 and change it from the locked state to the unlocked state, without interfering with operation of the other mechanism. The bolt-cam 80 contains the locking surface 81 to engage into the flexible-end neck 172 of the flexible end 171 of the cable 170 during the locked state. The center-pole 82 of the bolt-cam 80 is assembled into the bolt-cam-pole slot 35 of the body rear side 30. The bolt-cam spring 220 is assembled on the spring receiving arm 84 of the bolt-cam 80. The other end of the bolt-cam spring 220 is assembled into the spring-receiving-pin 111 of the snap plate 110. The tail 112 of the snap plate 110 is pushed into the middle surface 104 of the indicator 100. In this position, the center-pole 82 of the bolt-cam 80 acts as a center point such that the pushing of the spring 220 will cause the bolt-cam 80 to have rotational movement (e.g., counterclockwise for locking, clockwise for opening from the key user insert keys at the bottom point of view) until control surface 83 contacts the control wall 94 of the button 90 for unlocking via the combination controlled mechanism. The control surface 83 has a section which will contact the bolt-contact-surface 72 of the key controlled latch 70 which is configured for operation by the key controlled mechanism. Both the control wall 94 of the button 90 and the bolt-contact-surface 72 of the key controlled latch 70 will contact the control surface 83 of the bolt-cam 80. Since the button 90 and the key controlled latch 70 are in a locked position, the control wall 94 and the bolt-contact-surface 72 will have no movement which will make the bolt-cam 80 remain in the lock state. The opening notch 85 of the bolt-cam 80 is not aligned to the flexible-end-neck 172 of the cable 170 and the locking surface 81 is engaged into the flexible-end-neck 172 which makes the cable 170 remain in the locked position within the padlock 10 and the padlock 10 is in the locked mode.

Still referring to FIGS. 1A-18, the button 90 contains the push-area 91 for the user to push the button 90 inward to open the padlock 10 via the combination controlled mechanism if all of the dials 140 are aligned into the correct lock open code. The slope 92 of the button 90 is configured to contact the slope 121 of the spindle 120. The spindle 120 in the locked mode will not move downward since the opening-gaps 132/152 of the clutch 130/reset clutch 150 are not aligned to the one or more extended-fins 122 of the spindle 120. The spindle spring 200 is assembled between the spring-load-area 123 and the upper most clutch 130. The spindle spring 200 pushes the spindle 120 upward during the locked mode which does not allow the user to push the button 90 inward to push the slope of 92 of the button 90 and slide the slope 121 of the spindle 120 downward to open the padlock 10. The button 90 further includes the indicator-contact-surface 93 which is used when the padlock 10 is being opened by the key controlled mechanism to cause the indicator 100 to pop upward to at least partially extend out of the body rear side 30 of the padlock 10, and the user could push the button 90 inward when the dials 140 are all aligned to the correct lock open code, which will make the extended-fins 122 of the spindle 120 align to the opening-gaps 132/152 of the clutch 130/reset clutch 150. This will make the indicator-contact-surface 93 engage with the tail 112 of the snap plate 110 to move away from the neck surface 102 of the indicator 100 and allow the indicator spring 210 will push the indicator 100 inward back to the original locked position.

If all of the dials 140 are in the correct lock open code, the control wall 94 of the button 90 can be pushed to contact the control surface 83 of the bolt-cam 80 to let the bolt-cam 80 rotate from the locking-surface 81 to the opening-notch 85 to align with the flexible-end-neck 172 of the cable 170 to operate the padlock 10 to the unlocked mode. The spring rod 60 has a spring 230 to let the spring rod 60 pop upward to push the flexible-end 171 of the cable 170 away from the cable end channel-flexible end 21/31 of the lock body 20/30.

The snap plate 110 contains the spring-receiving-pin 111 to engage with the bolt-cam spring 220. The other end of the bolt-cam spring 220 will engage with the spring-receiving-arm 84 of the bolt-cam 80. The tail 112 of the snap plate 110 will be in contact with the middle surface 104 of the indicator 100 in the locked mode. When the key controlled mechanism opens the padlock 10, the indicator-slope 73 of the key controlled latch 70 will engage with the slope 103 of the indicator 100 and move the indicator 100 upward. As the indicator 100 moves upward, the neck surface 102 of the indicator 100 aligns to the tail 112 of the snap plate 110. The bolt-cam spring 220 will exert force such that the tail 112 will completely engage into the neck surface 102 of the indicator 100 which makes the indicator 100 stay in the popped-up position to indicate to the user the padlock 10 has been opened by the key controlled mechanism. To reset the indicator 100 back into the padlock 10, the user must open the padlock 10 via the combination controlled mechanism, such that indicator-contact-surface 93 of the button 90 moves and pushes the tail 112 of the snap plate 110 away and disengages the neck surface 102 of the indicator 100. In such position, the indicator spring 210, will push the indicator 100 downward and the indicator 100 will be set back to the original position.

The spindle 120 contains a slope 121 which is configured to contact the slope 92 of the button 90. If the correct lock open code has been set on all of the dials 140, the slope 92 of the button 90 will push the slope 121 of the spindle 120 and will make the spindle 120 have rectilinear movement. As the spindle 120 moves downward, the extended-fin 122 of the spindle 120 will travel through the opening-gap 132/152 of the clutch 130/reset clutch 150. The opening-gaps 132/152 will align with all of the extended-fins 122 of the spindle 120 when the correct lock open code has been entered on all of the dials 140. The opening gap 132/152 of the clutch 130/reset clutch 150 allows the extended-fin 122 to travel through so that the spindle 120 may have rectilinear movement within the lock body of the padlock 10.

The spindle 120 contains the spring-load-area 123 to engage with the spindle-spring 200, which is configured to push the slope 121 of the spindle 120 upward toward the slope 92 of the button 90. The other end of the spindle-spring 200 will push the clutches 130 and the reset clutch 150 downward. In the locked mode, at least one of the opening gaps 132 of the clutch 130 and/or the opening gap 152 of the reset clutch 150 is not aligned with the corresponding extended-fin 122 of the spindle 120 which prevents the spindle 120 from moving downward. The spindle 120 further comprises a tail 124 which is to engage into the spindle tail slot 28/39 of the body 20/30. Such engagement will restrict the spindle 120 from having any rotational movement to ensure the one or more extended-fins 122 will have no rotational movement.

The fixed end 173 of the cable 170 contains the fixed-end terminal neck 174 which is to be assembled into the fixed neck slot 30*d* and passed through the cable end channel-fixed end 22/32 of the body 20/30 to restrict any vertical movement to the fixed end 173 of the cable 170.

The lock body 20/30 of the padlock 10 further contains the cylinder hole 23 to house the cylinder 40, the cam holes 24/34 to house the cam 50, the button slots 26/37 to house the button 90, the reset wing slots 27/38 house the wings 161 of the reset plate 160 to give the reset plate 160 to have a certain horizontal (left and right) moving area for the reset function, the clutch holes 29/30*a* to receive the clutches 130/reset clutch 150, the dial holes 29/30*b* which are cut outs to receive the dials 140 and for the user to be able to access the dials 140, the clutch protrusion slots 20*b*/30*b* which are to receive the extended fins 131/151 of the clutch 130 and reset clutch 150 during the reset mode to restrict rotational movement from the clutches 130 and reset clutch 150 during the reset mode, and the sub-body slot 25 which is to assemble the sub-body 180 for easier for assembly of the bolt-cam spring 220 during the assembly process.

Figure 19A:
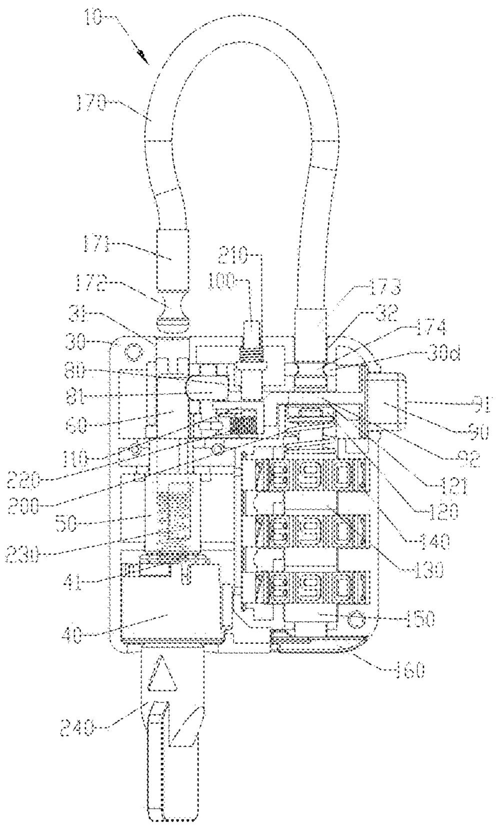
FIG. 19A is a front view of the exemplary padlock according to an aspect of the invention in an unlocked mode by the key controlled mechanism with the exemplary body front side and the exemplary sub-body removed.
Figure 19B:
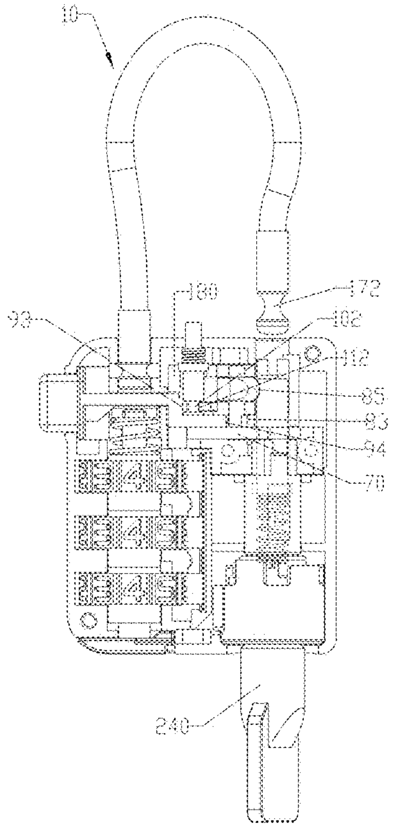
FIG. 19B is a rear view of the exemplary padlock with the exemplary body rear side removed.
Figure 19C:
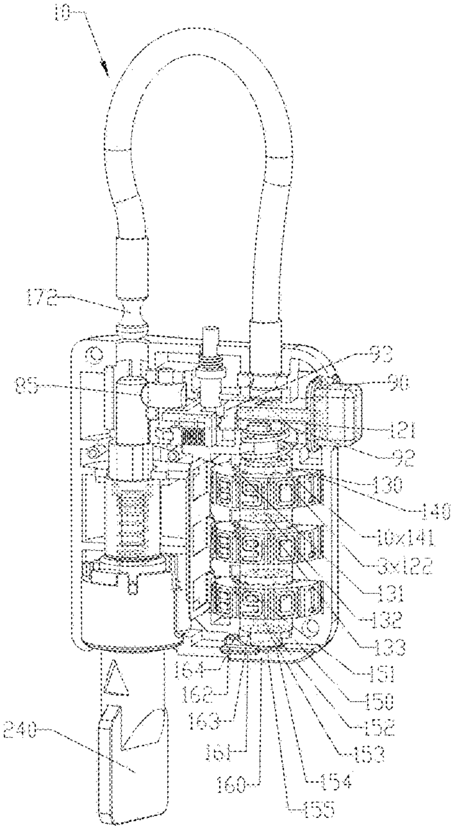
FIG. 19C is a perspective front view of the exemplary padlock with the exemplary body front side and the exemplary sub-body removed.
Figure 19D:
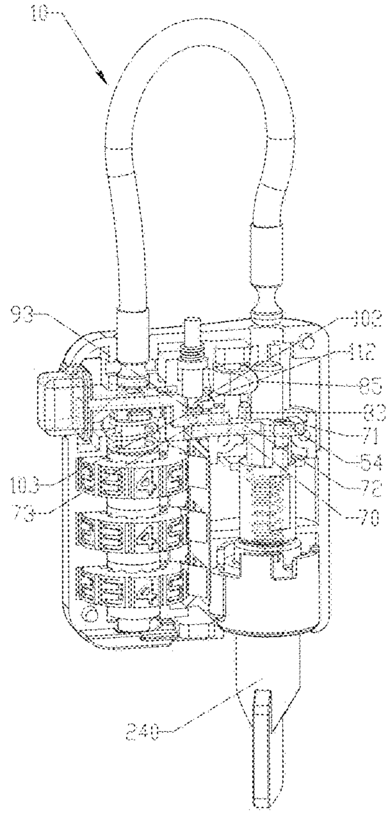
FIG. 19D is a perspective rear view of the exemplary padlock with the exemplary body rear side removed.
Figure 19E:
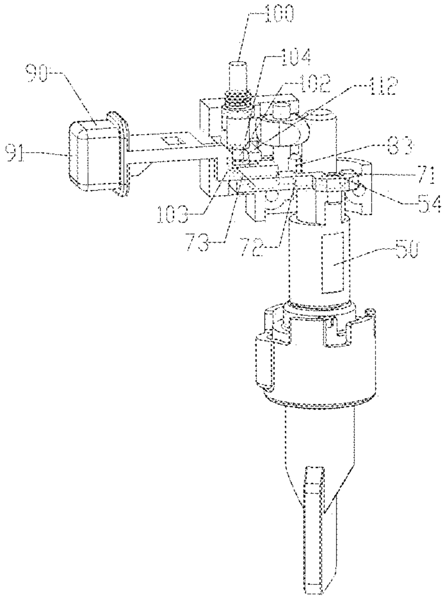
FIG. 19E is a perspective view of the exemplary locking mechanism that may be used with the exemplary padlock according to an aspect of the present invention.
Figure 19F:
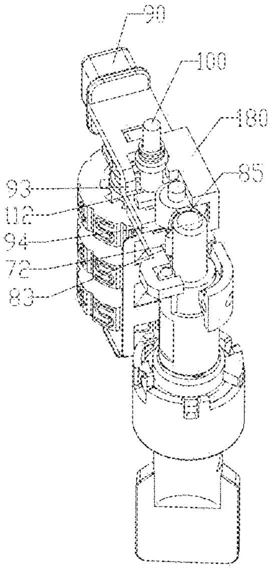
FIG. 19F is a perspective view of the exemplary locking mechanism operatively coupled to the exemplary cylinder and combination controlled mechanism that may be used with the exemplary padlock according to an aspect of the present invention.
Figure 19G:
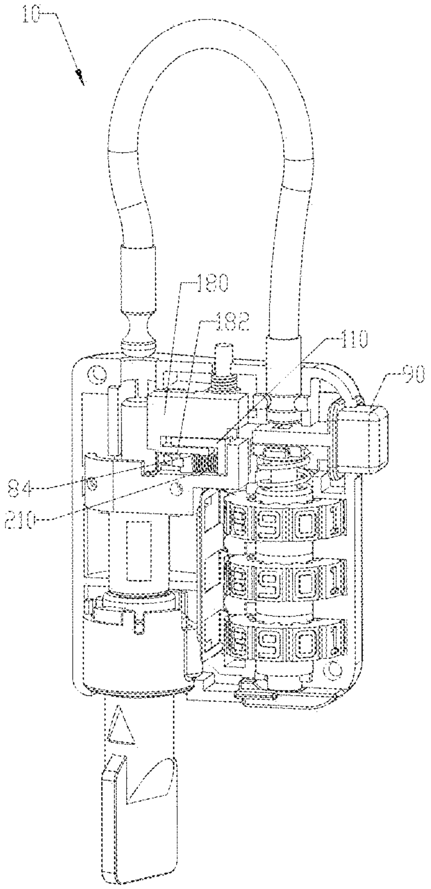
FIG. 19G is a perspective front view of the exemplary padlock with the exemplary body front side sub-body removed.

Referring now to FIGS. 19A-19G, the operation of the padlock 10 by the key controlled mechanism will now be discussed. The key controlled mechanism includes the cylinder 40 which contains the joint slot 41 to engage into the joint square 51 of the cam 50. When the correct cut key 240 is inserted into the cylinder 40, the cylinder 40 is configured to rotate when the correct cut key 240 is turned. As the cylinder 40 rotates, the cam 50 will rotate in the same manner. The extended round tip 54 of the cam 50 engages into the catcher 71 of the key controlled latch 70. As the cylinder 40 rotates clockwise in the direction to configure the padlock 10 in the unlocked mode, the extended round tip 54, which is engaged into the catcher 71, will cause the key controlled latch 70 to slide leftward such that the bolt-contact-surface 72 will contact the control surface 83 of the bolt-cam 80. As a result of this engagement, the bolt-cam 80 will rotate clockwise and the locking surface 81 will rotate away from the flexible-end neck 172 of the cable 170. As the cylinder 40 and cam 50 continue to rotate clockwise, the engagement of the extended round tip 54 and the catcher 71 will continue to drag and slide the key controlled latch 70 leftward such that the control surface 83 of the bolt cam 80 will rotate until the opening notch 85 aligns with the flexible-end neck 172. As the opening notch 85 aligns with the flexible-end neck 172, the spring rod spring 230 will push the spring rod 60 upward. As the spring rod 60 pushes upward, it will align the opening notch 85 of the bolt-cam 80 and the flexible end 171 will pop out of the cable end channel-flexible end 21/31 of the lock body 20/30 and the padlock 10 is opened to the unlocked mode by the key controlled mechanism.

At the same moment, as the key controlled latch 70 is being pushed leftward, the indicator slope 73 of the key controlled latch 70 will contact and slide the slope 103 of the indicator 100. As the key controlled latch 70 continues to move leftward, the indicator slope 73 will drag the slope 103 of the indicator 100 upward until the tail 112 of the snap plate 110 engages the neck surface 102 of the indicator 100. The tail 112 will snap into the neck surface 102 due to the placement of bolt-cam spring 220 such that one end is assembled on the spring-receiving-arm 84 of the bolt-cam 80 and the other end of the bolt-cam spring 220 is assembled on the spring-receiving-pin 111 of the snap plate 110. The bolt-cam spring 220 has three purposes: 1. The bolt-cam spring 220 will push the bolt-cam 80 such that the bolt-cam 80 will have rotational movement (e.g., counterclockwise locking movement) such that the locking surface 81 will engage with the flexible-end neck 172 of the cable 170 in the locked mode. 2. In the unlocked mode via the combination control mechanism or key control mechanism once the flexible-end neck 172 pops out of the lock holes 21/31 of the lock body, the bolt-cam spring 220 will push the opening notch 85 of the bolt-cam 80 to engage the spring rod 60 to inhibit the bolt-cam 80 from rotating counterclockwise back to the lock state. 3. In the unlocked mode via key control mechanism, with the engagement of the opening notch 85 of the bolt-cam 80 and the spring rod 60, the bolt-cam spring 220 will push the snap plate 110 rightward such that the tail 112 engages to the neck surface 102 of the indicator 100. The indicator 100 is now popped upward and showing to the owner that the padlock 10 has been opened by a key, for example, that luggage on which the padlock is engaged has been inspected by the inspectors. The only way to let the indicator 100 retract is to have the correct lock open code to let the indicator 100 retract. After inspection, the inspector could push the flexible end 171 of the cable 170 back into the cable end channel-flexible end 21/31 of the body 20/30. The flexible end 171 will push the spring rod 60 downward and the flexible-end neck 172 will align to the opening-notch 85 of the bolt cam 80. As they align, the bolt-cam spring 220 will push and rotate the bolt cam 80 (e.g., counterclockwise) such that the locking surface 81 will engage to the flexible-end neck 172 of the cable 170. The control surface 83 of the bolt-cam 80 will force the bolt-contact-surface 72 rightward back to the locking position. The catcher 71 is engaged to the extended round tip 54 which will cause the cam 50 to rotate counterclockwise back to the locked position. Then the key user or inspector could now withdraw the correct cut key 240 out of the padlock 10. In addition, as a result of the the tail 112 of the snap plate 110 engaged with the neck surface 102 of the indicator 100, the indicator 100 remains popped upward. In the unlocked mode via the key controlled mechanism, the button 90, spindle 120, clutch 130, dial 140, reset clutch 150, and the reset plate 160 are all undisturbed, which means that operation of the padlock 10 to the unlocked mode via key controlled mechanism does not interfere with these combination controlled mechanism parts.

Figure 20A:
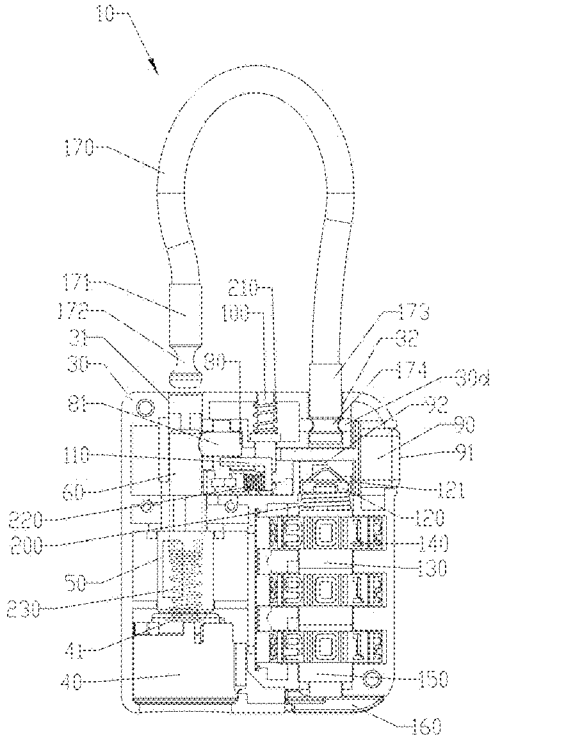
FIG. 20A is a front view of the exemplary padlock according to an aspect of the invention in an unlocked mode by the combination controlled mechanism with the exemplary body front side and the exemplary sub-body removed.
Figure 20B:
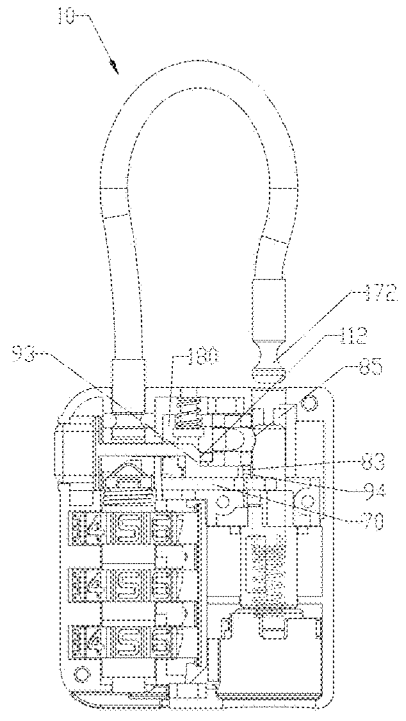
FIG. 20B is a rear view of the exemplary padlock with the exemplary body rear side removed.
Figure 20C:
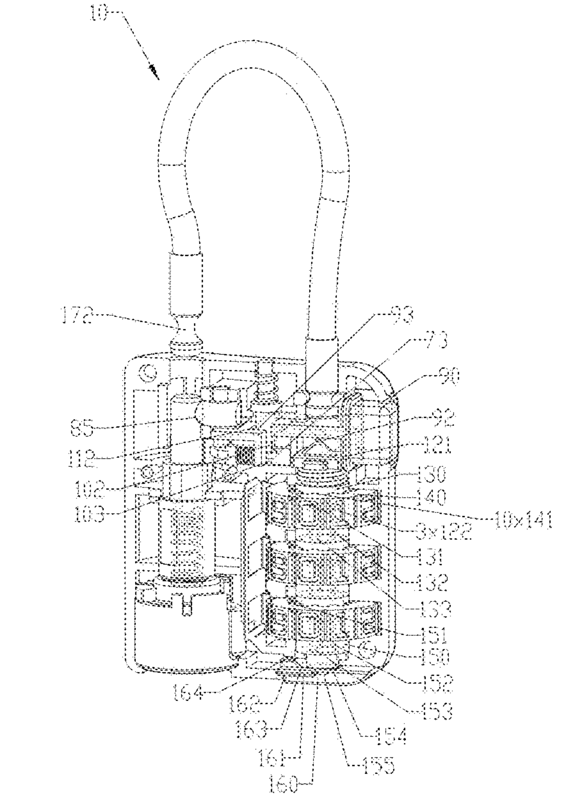
FIG. 20C is a perspective front view of the exemplary padlock with the exemplary body front side and the exemplary sub-body removed.
Figure 20D:
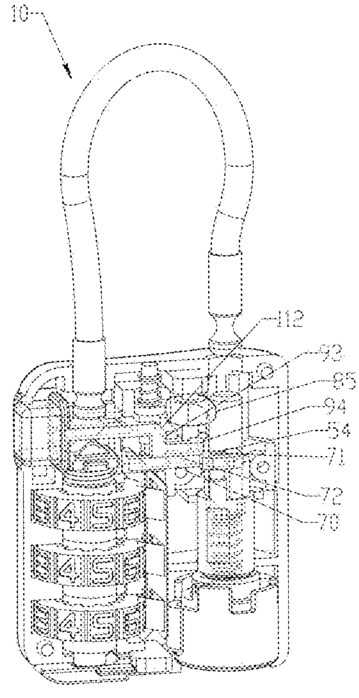
FIG. 20D is a perspective rear view of the exemplary padlock with the exemplary body rear side removed.
Figure 20E:
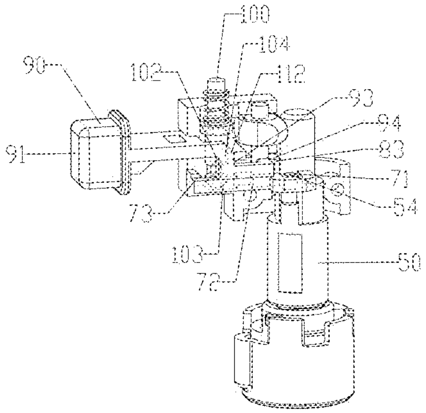
FIG. 20E is a perspective view of an exemplary locking mechanism that may be used with the exemplary padlock according to an aspect of the present invention.
Figure 20F:
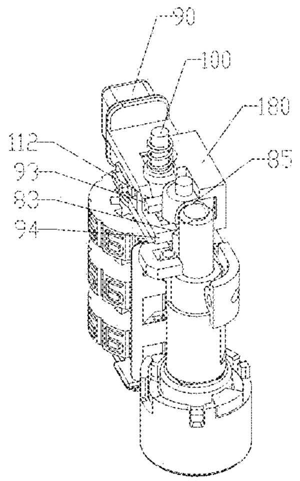
FIG. 20F is a perspective view of the exemplary locking mechanism operatively coupled to an exemplary cylinder and combination controlled mechanism that may be used with the exemplary padlock according to an aspect of the present invention.
Figure 20G:
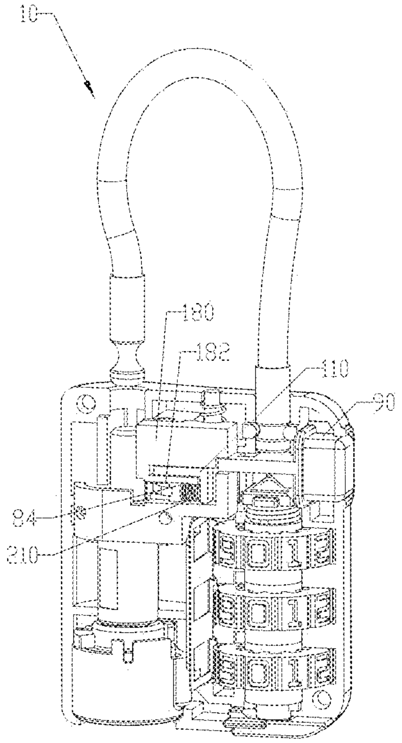
FIG. 20G is a perspective front view of the exemplary padlock with the exemplary body front side sub-body removed.

Referring now to FIGS. 20A-20G, the operation of the padlock 10 by the combination controlled mechanism and resetting of the indicator 100 will now be discussed. When the padlock 10 has been opened by the key controlled mechanism, the indicator 100 will be extended from the padlock 10 indicating that the padlock 10 was unlocked using the key controlled mechanism, e.g., by an inspector. The tail 112 of the snap plate 110 engaged into the neck surface 102 of the indicator 100 inhibits the indicator 100 from going back downward into the padlock 10. The indicator 100 in its popped-up position at least partially extending from the lock body of the padlock 10 shows the user the padlock 10 has been operated to the unlocked mode by the key controlled mechanism. In order to reset the indicator 100, the user must rotate all dials 140 to the correct lock open code. The dials 140 contains the set of teeth 141 which are engaged with the extended-fins 131/151 of the clutch 130 and reset clutch 150. As the dials 140 rotate, the clutch 130 and reset clutch 150 will rotate in the same manner as the corresponding dial 140. The spindle holes 133/153 are in place to let the spindle 120 pass through the clutches 130 and reset clutch 150. As the correct lock open code is aligned on the dials 140, the opening-gaps 132/152 of the clutches 130 and reset clutch 150 align with the extended-fins 122 of the spindle 120 and the spindle 120 is no longer inhibited from moving downward. In this position, the user can press the push-area 91 of the button 90, and the slope 92 of the button 90 will slide the slope 121 of the spindle 120 downward. As the slope 121 moves downward, the button 90 would be able to move further leftward. As the button 90 moves further leftward, the control wall 94 will contact the control surface 83 of the bolt-cam 80. As the bolt-cam 80 rotates clockwise such that the locking surface 81 will rotate away from the flexible-end neck 172 of the cable 170 and as the bolt-cam 80 continues to rotate, the opening notch 85 will align to the flexible-end neck 172, and the spring rod spring 230 will exert force to push the spring rod 60 upward until the spring rod 60 algins to the opening notch 85 of the bolt-cam 80 and inhibits the bolt-cam 80 from having counterclockwise movement. The spring rod 60 contains a protrusion 61 and which is to guide the spring rod to push upward or downward within the protrusion slot 53 of the cam 50. The flexible end 171 has now being pushed out of the cable end channel-flexible end 21/31 of the lock body 20/30.

As described in the opening in key mode, the indicator 100 has been popped upward. In the operation of the padlock 10 to the unlock mode via the combination controlled mechanism, if the user pushes the button 90 in leftward, the indicator contact surface 93 will push the tail 112 of the snap plate 110 leftward such that the tail 112 will disengage away from the neck surface 102 of the indicator 100. The indicator slot 36 is assembled on the indicator 100 for the indicator 100 to reset and travel in the indicator slot 36. The indicator spring 210 pushes the large diameter 101 of the indicator 100 downward, and the indicator 100 will pop back to the original place. As the indicator 100 moves downward, the middle-surface 104 will align to the tail 112 of the snap plate 110 for the next inspection using the key controlled mechanism.

After opening the padlock 10 via the combination controlled mechanism and resetting the indicator 100 back to the original position, the user can release the push button 90. The user could insert the flexible end 171 of the cable 170 back to the cable end channel-flexible end 21/31 of the lock body. The flexible end 171 will push the spring rod 60 downward and the flexible-end neck 172 will align to the opening-notch 85 of the bolt cam 80. As they align, the bolt-cam spring 220 will push and rotate the bolt cam 80 counterclockwise such that the locking surface 81 will engage back to the flexible-end neck 172 of the cable 170. In addition, the bolt-cam 80 rotates counterclockwise then the control surface 83 of the bolt-cam 80 will push the control wall 94 of the button 90 rightward. As the button 90 pushes rightward the slope 92 of the button 90 will move rightward and it will yield a space to let the slope 121 of the spindle 120 push upward. The spindle 120 is being pushed upward due to the spindle spring 200 is assembled between the spindle-load-area 123 of the spindle 120 and the first clutch 130. The spindle spring 200 will exert force to push the spindle 120. As the spindle 120 is pushed back upward the extended-fin 122 of the spindle 120 moves away from the opening-gaps 132/152 of the clutches 130 and reset clutch 150. As the opening-gap 132/152 is disengaged from the extended-fins 122 of the spindle 120, the user can rotate the dials 140 such that the opening-gap 132/152 of the clutches 130/150 would move away from the extended-fins 122 of the spindle 120. The teeth 141 of the dials 140 are engaged with the extended-fin 131/151 of the clutches 130/150 such that the rotation of the dials 140 will move the clutches 130/150 in the same manner. In the operation of the padlock 10 to the unlocked mode via the combination controlled mechanism, the cylinder 40, cam 50, and key controlled latch 70 are all undisturbed, which means that the combination controlled mechanism does not interferer these key controlled mechanism parts.

The body rear side 30 contains the indicator slot 36 to receive the indicator 100. The sub-body 180 is to cover the bolt-cam 80, the indicator 100, and the bolt-cam spring 220. Such sub-body 180 is for ease of assembly since to the bolt-cam spring 220 will force the bolt-cam 80 to rotate and with the sub-body 180 it will be easier to assemble the components into the entire padlock 10. The sub-body 180 contains the bolt-cam cutout zone 181 which is to provide space to assemble the bolt cam 80 into the sub-body 180. The sub-body 180 also includes the bolt cam spring cutout 182 to let the bolt-cam spring 220 have action within the cam spring cutout 182. The snap plate tail receiving zone 183 is to let the tail 112 of the snap plate 110 move within this area. The clutches 130/150 are assembled on the clutch holes **29/30*a* of the lock body 20/30. The ratchet plate 190 is assembled to give ratchet feeling to the dial 140**.

Figure 21A:
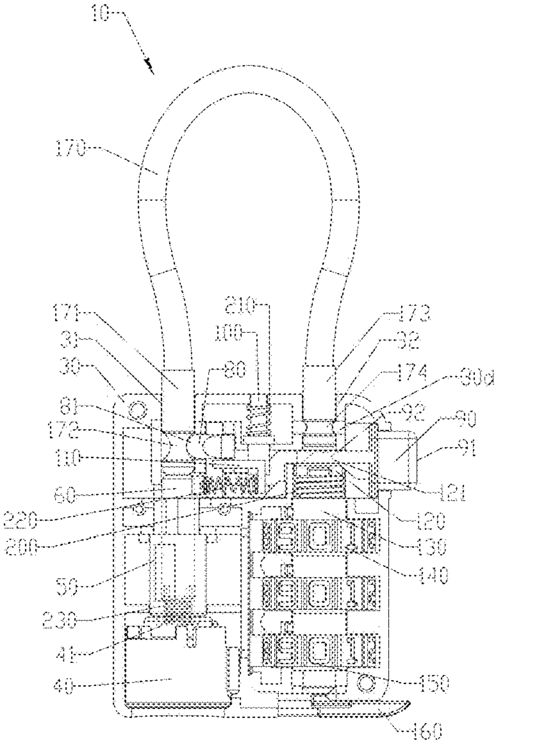
FIG. 21A is a front view of the exemplary padlock according to an aspect of the invention in a reset mode with the exemplary body front side and the exemplary sub-body removed.
Figure 21B:
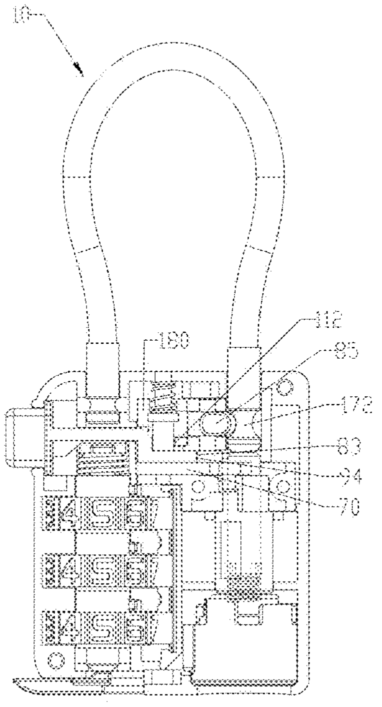
FIG. 21B is a rear view of the exemplary padlock with the exemplary body rear side removed.
Figure 21C:
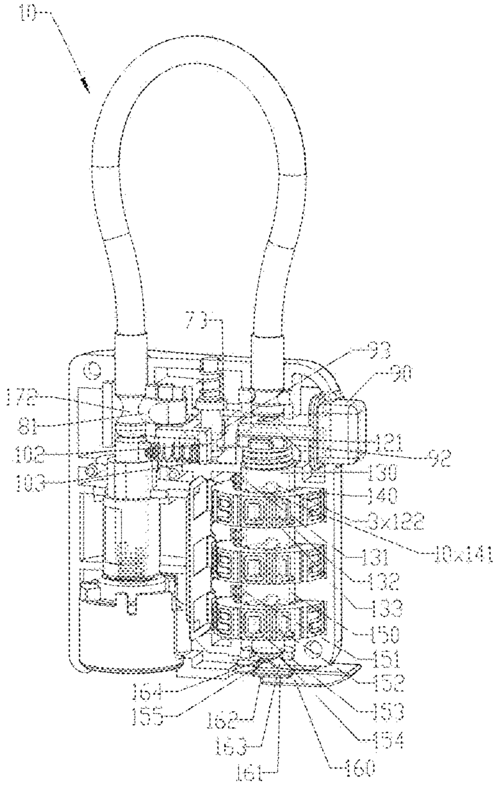
FIG. 21C is a perspective front view of the exemplary padlock with the exemplary body front side and the exemplary sub-body removed.
Figure 21D:
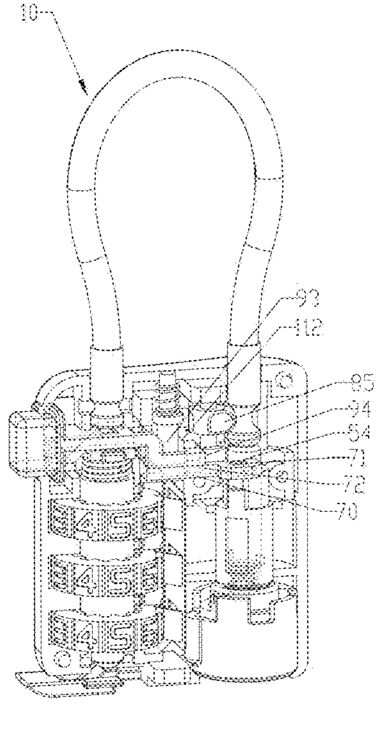
FIG. 21D is a perspective rear view of the exemplary padlock with the exemplary body rear side removed.

Referring now to FIGS. 21A-21D, the resetting and/or configuring of the correct lock open code for the combination controlled mechanism will now be discussed. The padlock 10 contains a reset plate 160 which will help the user to have both hands free during the entire reset mode. The reset plate 160 is also useful as an indicator to the user that the padlock 10 is in the reset mode. To reset and/or reconfigure the correct lock open code for the combination control mechanism, the user needs to make all dials 140 align to the correct lock open code such that the opening-gaps 132/152 of the clutches 130/reset clutch 150 aligns with the extended-fins 122 of the spindle 120. The gap 162 of the reset plate 160 is a step design which allows the user to place a finger nail or sharp object to slide the reset plate 160 rightward for the reset process. The user could slide the reset plate 160 rightward such that the slope 163 of the reset plate 160 contacts the slope 154 of the reset clutch 150 and the reset clutch 150 is then slid upward. The reset plate 160 will be able to slide within a range and being guided by the wings 161, and it will be allowed to slide in between the reset wing slot 27/38 of the body 20/30. As the reset plate 160 slides to the furthest rightward, the edge 155 of the reset clutch 150 will be placed into the edge 164 of the reset plate 160. As the reset clutch 150 is being slide upward, the stack of clutches 130 are also being slide upward in the same manner. As all of the clutches 130/150 are being slide upward, the extended-fins 131/151 of the clutches 130/150 will disengage away from the teeth 141 of the dials 140. The extended-fins 131/151 will now be placed into the clutch protrusion slot **20*b*/30*c* such that the clutches 130/150 will have no rotational movement during the reset process. The user could rotate the dial 140 now freely to the desired new correct lock open code as the clutches 130/150 are not rotated in the same manner. The reset plate 160 in the entire reset process is extended outward as an indication to the user that the padlock 10 is in the reset mode. As the user finishes setting the new correct lock open code, the user could push the extended reset plate 160 leftward/inward such that the edge 155 and the edge 164 will move away and the spindle spring 200 will exert force to let the stack of clutches 130/150 to push the reset clutch 150 downward back to the original position. As the clutches 130/150 are being pushed downward then the extended-fin 131/151 of the clutches 130/150 will engage back to the teeth of the dials 140**.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A padlock, comprising:

a lock body;

a bolt-cam mounted in the lock body and configured for rotational movement between a lock state and unlock state;

a combination controlled mechanism configured to control the rotational movement of the bolt-cam at least from the lock state to the unlock state;

a key controlled mechanism configured to control the rotational movement of the bolt-cam between the lock state and the unlock state; and a cable having a flexible-end neck configured for retention and removal from the lock body and a fixed end terminal neck mounted in the lock body, and wherein the flexible-end neck is operatively engaged with the bolt-cam for configuring the padlock between a locked mode when the flexible-end neck is retained in the locked body and an unlocked mode when the flexible-end neck is removed from the lock body;

wherein the combination controlled mechanism comprises a spindle mounted for rectilinear movement within the lock body, one or more clutches and a reset clutch mounted in the lock body and configured to control rectilinear movement of the spindle within the lock body, wherein the one or more clutches and the reset clutch are configured for rotational movement about the spindle;

wherein the combination controlled mechanism further comprises a plurality of dials mounted in the lock body, wherein the plurality of dials comprise one dial for each clutch of the one or more clutches and the reset clutch, and wherein each dial of the plurality of dials are configured to control the rotational movement of the corresponding clutch or reset clutch;

wherein the bolt-cam comprises a locking surface configured to engage with the flexible-end neck of the cable during the locked mode; and wherein the bolt-cam further comprises a spring receiving arm configured to receive a bolt-cam spring, wherein the bolt-cam spring is configured to urge the bolt-cam to the lock state such that the locking surface is urged into engagement with the flexile-end neck of the cable, wherein the bolt-cam spring is further configured to receive a spring-receiving pin of a snap plate, and wherein the bolt-cam spring is further configured to urge a tail of the snap plate toward an indicator such that when the key controlled mechanism controls the bolt-cam from the lock state to the unlock state the tail of the snap plate will engage into a neck surface of the indicator.

2. The padlock according to claim 1, wherein the bolt-cam comprises a pair of surfaces positioned on opposite sides of the bolt-cam, and wherein the bolt-cam further comprises a center-pole extending from at least one surface of the pair of surfaces and configured to restrict movement of the bolt-cam within the lock body to only the rotational movement of the bolt-cam between the lock state and the unlock state.

3. The padlock according to claim 1, wherein the bolt-cam comprises an opening notch configured to align with the flexible-end neck of the cable when the bolt-cam is in the unlock state to allow the flexible end cable to be removed from the lock body in the unlocked mode of the padlock.

4. The padlock according to claim 1, wherein the bolt-cam comprises a control surface configured to allow the key controlled mechanism and combination controlled mechanism to control the rotational of the bolt-cam from lock state to the unlock state.

5. The padlock according to claim 4, wherein the bolt-cam control surface is configured to allow the key controlled mechanism to operate the padlock from the locked mode to the unlocked mode without interference with the combination controlled mechanism.

6. The padlock according to claim 4, wherein the bolt-cam control surface is configured to allow the combination controlled mechanism to operate the padlock from the locked mode to the unlocked mode without interference with the key controlled mechanism.

7. The padlock according to claim 1, wherein the combination controlled mechanism further comprises a button, and a reset plate to control the rotational movement of the bolt-cam from the lock state to the unlock state.

8. The padlock according to claim 1, wherein the key controlled mechanism comprises a cylinder mounted in the lock body, a cam operatively connected to the cylinder, and a key controlled latch to control the rotational movement of the bolt-cam from the lock state to the unlock state.

9. The padlock according to claim 8, wherein the indicator is configured to be activated by the key controlled mechanism and reset by the combination controlled mechanism, wherein the indicator comprises a middle-surface configured for engagement with the tail of the snap plate, and when the key controlled mechanism is operated an indicator-slope of the key controlled latch will engage with a slope of the indicator to cause at least a portion of the indicator to protrude from the lock body, wherein the bolt-cam spring will urge the tail of the snap plate to engage with the neck surface of the indicator to lock the indicator in position protruding from the lock body, and wherein the indicator is configured to be reset by the combination controlled mechanism allows movement of the bolt-cam to the unlocked state.

10. The padlock according to claim 7, wherein the reset plate is configured to at least partially extend out from the lock body as an indication the padlock is in the reset mode;

and wherein a correct lock open code must be set on all the dials to operate the padlock to the reset mode.

11. The padlock according to claim 10, wherein the spindle comprising at least one extended-fin configured to align with the opening gap of the clutches and reset clutch to allow the reset plate to slide the clutches and reset clutch upward to operate the padlock into the reset mode.

12. The padlock according to claim 11, wherein the reset plate contains a slope member to slide a slope of the reset clutch upward during the reset mode.

13. The padlock according to claim 12, wherein the reset plate contains an edge to align an edge of the reset clutch such that the reset clutch will hold the reset plate in position during the reset process and allow the user to have both hands free for setting the new lock open code.

14. The padlock according to claim 7, wherein the spindle comprises an extended-fin for each of the one or more clutches and the reset clutch, and each of the one or more clutches and the reset clutch comprise an opening gap formed therein to allow the corresponding extended-fin to pass therethrough.

15. The padlock according to claim 14, wherein when a correct lock open code has been set on all the dials the opening-gaps of the one or more clutches and reset clutch align with the corresponding extended-fins of the spindle, wherein the button is configured to be pushed inward into the lock body when the correct lock open code has been set, and a slope of the button will push a slope of the spindle in a direction substantially perpendicular to the movement of the button such that the extended-fins of the spindle travel into the corresponding opening gaps of the one or more clutches and reset clutch, wherein the movement of the spindle allow the button to travel further inward and a control wall of the button to contact the bolt-cam which will allow the bolt-cam to rotate to the unlock state, such that an opening notch of the bolt-cam aligns with the flexible-end neck of the cable which alignment allows a spring rod to push the flexible end cable out of the lock body to operate the padlock to the unlocked mode.

16. The padlock according to claim 15, wherein the button further comprises an indicator-contact-surface configured to push the tail of the snap plate away from the neck surface of the indicator which an indicator spring to push the indicator into the lock body.

17. The padlock according to claim 1, wherein the key controlled mechanism comprises a cylinder mounted in the lock body, a cam operatively connected to the cylinder, and a key controlled latch to control the rotational movement of the bolt-cam from the lock state to the unlock state, when a correct cut key is inserted into the cylinder, the cylinder is configured to rotate and transfer such rotational movement to the cam as a result of operative engagement of a joint slot of the cylinder and a joint square of the cam, wherein the cam comprises an extended round tip which is configured for engagement with a catcher of the key controlled latch and the rotational movement causes rectilinear movement of the key controlled latch, wherein the key controlled latch comprises a bolt-contact-surface configured for operative engagement with a control wall of the bolt-cam to transfer the rectilinear movement of the key controlled latch to rotational movement of the bolt-cam such that the bolt-cam is placed in the unlocked state, wherein the bolt-cam comprises an opening notch configured to align with the flexible-end neck of the cable when the bolt-cam is in the unlock state to allow the flexible end cable to be removed from the lock body in the unlocked mode of the padlock.

18. The padlock according to claim 17, wherein as the key controlled latch comprises an indicator-slope configured to slide a slope of the indicator upward and cause the tail of the snap plate to engage into the neck surface of the indicator, wherein the indicator is extended out of the lock body indicating that the padlock has been operated to the unlocked mode by the key controlled mechanism.

* * * * *